US011095488B2

United States Patent
Barton et al.

(10) Patent No.: US 11,095,488 B2
(45) Date of Patent: Aug. 17, 2021

(54) OPTIMIZED PERFORMANCE WITH MIXED MEDIA ACCESS PROTOCOLS

(71) Applicant: Cisco Technology, Inc., San Jose, CA (US)

(72) Inventors: Robert E. Barton, Richmond (CA); Vishal S. Desai, San Jose, CA (US); Jerome Henry, Pittsboro, NC (US)

(73) Assignee: Cisco Technology, Inc., San Jose, CA (US)

( * ) Notice: Subject to any disclaimer, the term of this patent is extended or adjusted under 35 U.S.C. 154(b) by 79 days.

(21) Appl. No.: 16/544,515

(22) Filed: Aug. 19, 2019

(65) Prior Publication Data

US 2021/0058279 A1 Feb. 25, 2021

(51) Int. Cl.
| | |
|---|---|
| *H04W 72/12* | (2009.01) |
| *H04W 72/08* | (2009.01) |
| *H04W 74/02* | (2009.01) |
| *H04W 72/04* | (2009.01) |
| *H04L 27/00* | (2006.01) |

(52) U.S. Cl.
CPC ..... *H04L 27/0008* (2013.01); *H04W 72/0446* (2013.01); *H04W 72/085* (2013.01); *H04W 72/1215* (2013.01); *H04W 74/02* (2013.01)

(58) Field of Classification Search
CPC ........... H04W 72/0446; H04W 72/085; H04W 72/1215; H04W 74/02; H04W 74/04; H04W 74/08; H04W 84/12; H04L 27/0008
See application file for complete search history.

(56) References Cited

U.S. PATENT DOCUMENTS

| | | | |
|---|---|---|---|
| 9,602,319 B2 | 3/2017 | Li et al. | |
| 9,615,291 B2 | 4/2017 | Kenney et al. | |
| 2008/0171550 A1* | 7/2008 | Zhao | H04W 74/02 455/445 |
| 2010/0309872 A1* | 12/2010 | Amini | H04W 74/002 370/329 |

(Continued)

OTHER PUBLICATIONS

Lee, Kyu-haeng, "Performance Analysis of the IEEE 802.11ax MAC Protocol for Heterogeneous Wi-Fi Networks in Non-Saturated Conditions", (Sensors 2019, 19,1540) Mar. 29, 2019, 20 pages.

*Primary Examiner* — Maharishi V Khirodhar
*Assistant Examiner* — Kenneth P Hunt
(74) *Attorney, Agent, or Firm* — Merchant & Gould P.C.

(57) ABSTRACT

Optimized performance with a first media access protocol and a second media access protocol may be provided. First, media access for client devices associated with the first media access protocol may be scheduled for an Access Point (AP) for a first time period. The first time period may comprise a first predetermined amount of time. Next, media access for client devices associated with the first media access protocol may be paused for a second time period at the end of the first time period to allow client devices associated with the second media access protocol to access the media. The second time period may comprise a second predetermined amount of time. Then media access for client devices associated with the first media access protocol may be scheduled at the end of the second time period for a third time period. The third time period may comprise a third predetermined amount of time.

20 Claims, 5 Drawing Sheets

(56) References Cited

U.S. PATENT DOCUMENTS

2015/0111569 A1* 4/2015 Gupta .................... H04W 8/08
                                                    455/426.1
2017/0331714 A1   11/2017 Yang et al.
2018/0184458 A1    6/2018 Wilhelmsson
2018/0375740 A1* 12/2018 Chen .................. H04L 43/0894

* cited by examiner

OPTIMIZED PERFORMANCE WITH MIXED MEDIA ACCESS PROTOCOLS

TECHNICAL FIELD

The present disclosure relates generally to wireless access points.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP normally connects directly to a wired Ethernet connection and the AP then provides wireless connections using radio frequency links for other devices to utilize that wired connection. Most APs support the connection of multiple wireless devices to one wired connection. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
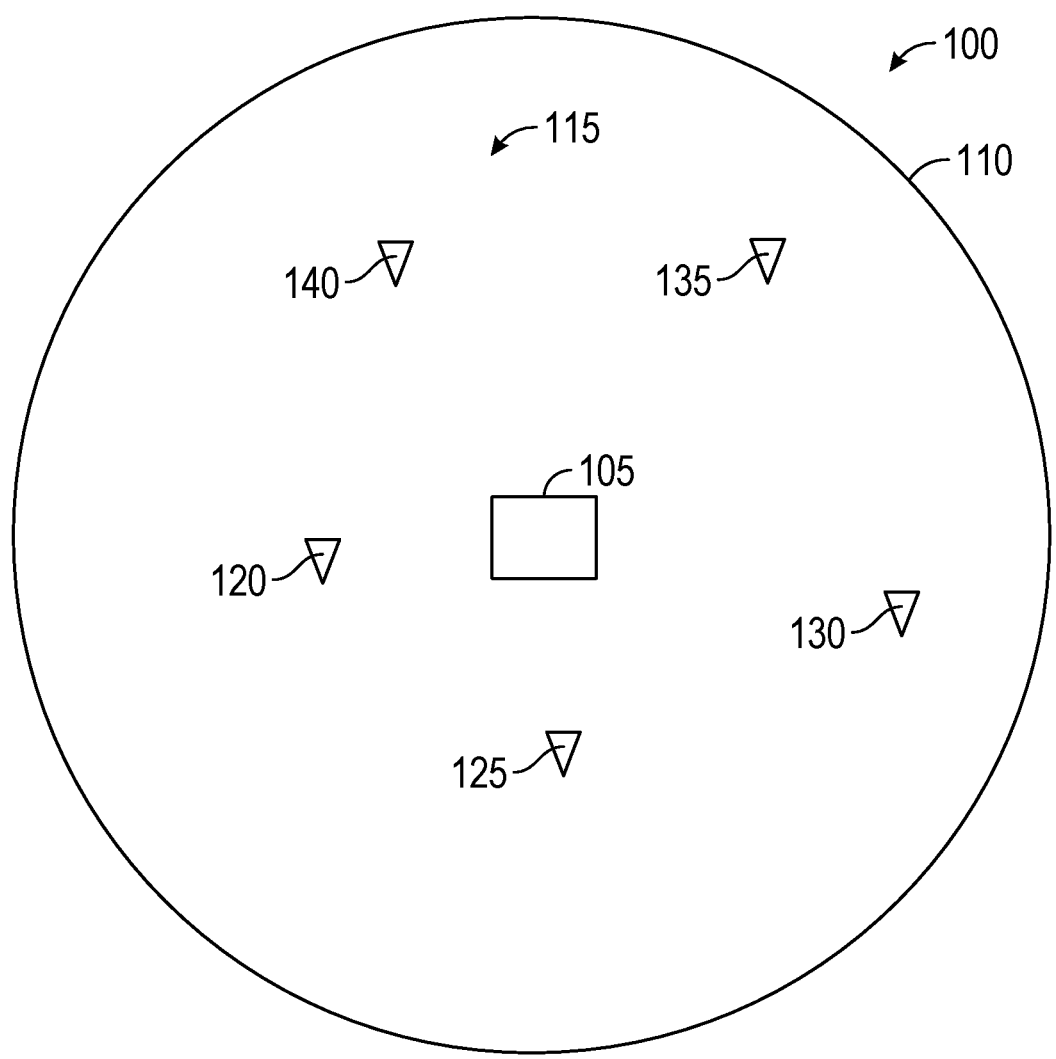
FIG. 1 is a block diagram of an operating environment.

Optimized performance with a first media access protocol and a second media access protocol may be provided. First, media access for client devices associated with the first media access protocol may be scheduled for an Access Point (AP) for a first time period. The first time period may comprise a first predetermined amount of time. Next, media access for client devices associated with the first media access protocol may be paused for a second time period at the end of the first time period to allow client devices associated with the second media access protocol to access the media. The second time period may comprise a second predetermined amount of time. Then media access for client devices associated with the first media access protocol may be scheduled at the end of the second time period for a third time period. The third time period may comprise a third predetermined amount of time.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Wireless Local Area Networks (WLANs) compatible with the 802.11ax specification standard, for example, may be required to support a mixture of both 802.11ax compatible client devices and legacy contention-based client devices not compatible with 802.11ax (e.g., client devices compatible with the 802.11ac specification standard). Client devices compatible with 802.11ax may have spectral efficiency advantages over legacy client devices (e.g., client devices compatible with 802.11ac) due to Uplink (UL)-Orthogonal Frequency-Division Multiple Access (OFDMA) used in 802.11ax. However, legacy client devices may suffer, for example, from inefficiencies of contention-based access processes (e.g., Carrier-Sense Multiple Access With Collision Avoidance (CSMA/CA)) that may be caused by collisions and retries. In addition, Access Points (APs) compatible with 802.11ax may have semi-deterministic control over client devices compatible with 802.11ax and may have visibility into their uplink transmission requirements whereas there may be little or no visibility or control of legacy contention-based client devices such as those compatible with 802.11ac.

As the number of 802.11ax compatible client devices increases, the risk of negatively impacting legacy client devices using contention-based access processes (e.g., client devices compatible with 802.11ac) may become a reality. At best, in a mixed environment, legacy client device performance may be disproportionately affected due to the presence of 802.11ax client devices with their UL-OFDMA process dominating media access. At worst, the legacy client devices may be starved by the 802.11ax UL-OFDMA process thus negatively impacting their performance. Embodiments of the disclosure may present a process to optimize mixed WLANs by offering legacy client devices a proportionally appropriate contention opportunity where they may be given media access without interference from the UL-OFDMA process, and thus optimize performance of the WLAN.

FIG. 1 shows an operating environment 100. As shown in FIG. 1, operating environment 100 may comprise an Access Point (AP) 105, a micro cell 110, and a plurality of client devices 115. AP 105 may provide wireless network (i.e., WLAN) access for plurality of client devices 115 and micro cell 110 may illustrate the coverage area of AP 105. Plurality of client devices 115 may comprise a first client device 120, a second client device 125, a third client device 130, a fourth client device 135, and a fifth client device 140. Each one of plurality of client devices 115 may comprise, but is not limited to, a smart phone, a personal computer, a tablet device, a mobile device, a cable modem, a cellular base station, a telephone, a remote control device, a set-top box, a digital video recorder, an Internet-of-Things (IoT) device, a network computer, a mainframe, a router, or other similar microcomputer-based device.

AP 105 may be compatible with the 802.11ax specification standard. A first portion of plurality of client devices 115 may be associated with a first media access protocol. The first media access protocol may use the UL-OFDMA process for media access to AP 105. The first portion of plurality of client devices 115 associated with the first media access protocol may be compatible with the 802.11ax specification standard. A second portion of plurality of client devices 115 may be associated with a second media access protocol. The second media access protocol may use contention-based access processes (e.g., CSMA/CA) for media access to AP 105. The second portion of plurality of client devices 115 associated with the second media access protocol may comprise legacy client devices and may be compatible with the 802.11ac specification standard. Accordingly, AP 105 may be required to support a mixture of both 802.11ax compatible client devices and legacy contention-based client devices not compatible with 802.11ax (e.g., compatible with 802.11ac).

OFDMA technology may be used by AP 105 to provide media access to client devices. When using OFDMA to provide media access, AP 105 may partition a channel into smaller sub-channels know as Resource Units (RUs) so that simultaneous multiple-user transmissions can occur. AP 105 may determine the RU allocation for multiple client devices for both downlink and uplink OFDMA. In other words, AP 105 may determine how RUs may be assigned to client devices within a given channel. The client devices may provide feedback to 802.11ax compatible AP 105 using, for example, solicited or unsolicited buffer status reports, however, AP 105 makes the decision in regards to RU allocation for synchronized UL-OFDMA from multiple client devices.

Contention-based access processes such as CSMA/CA may also be used on AP 105 to provide media access to client devices. When using, for example, CSMA/CA to provide media access, as soon as a client device is ready to send a packet, it checks to be sure the channel is clear (i.e., no other client device is transmitting at the time). The client device (and also for the AP in CSMA/CA mode) picks up a random number, waits for the channel to be clear/silent for a specific amount of time (i.e., Arbitrated Interframe Space (AIFS)), then counts down from the random number until it reaches zero. At any point of the count down, if another station is detected sending, the client device waits for the channel to be clear for an AIFS after the other transmission is completed, then resumes its count down from where it stopped. When the countdown reaches zero and the channel is clear, the client device sends. This is the Network Allocation Vector (NAV), counted down with the backoff timer (which may comprise a counter). If the channel is clear when the backoff counter reaches zero, the client device transmits the packet. If the channel is not clear when the backoff counter reaches zero (e.g., when the count reaches zero, another station happens to start sending), then the client device waits for the transmission to complete, then waits an AIFS, then observes that its countdown is zero and therefore sends without waiting further, the backoff factor is set again, and the process is repeated.

The elements described above of operating environment 100 (e.g., AP 105, first client device 120, second client device 125, third client device 130, fourth client device 135, and fifth client device 140) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 5, the elements of operating environment 100 may be practiced in a computing device 500.

Figure 2:
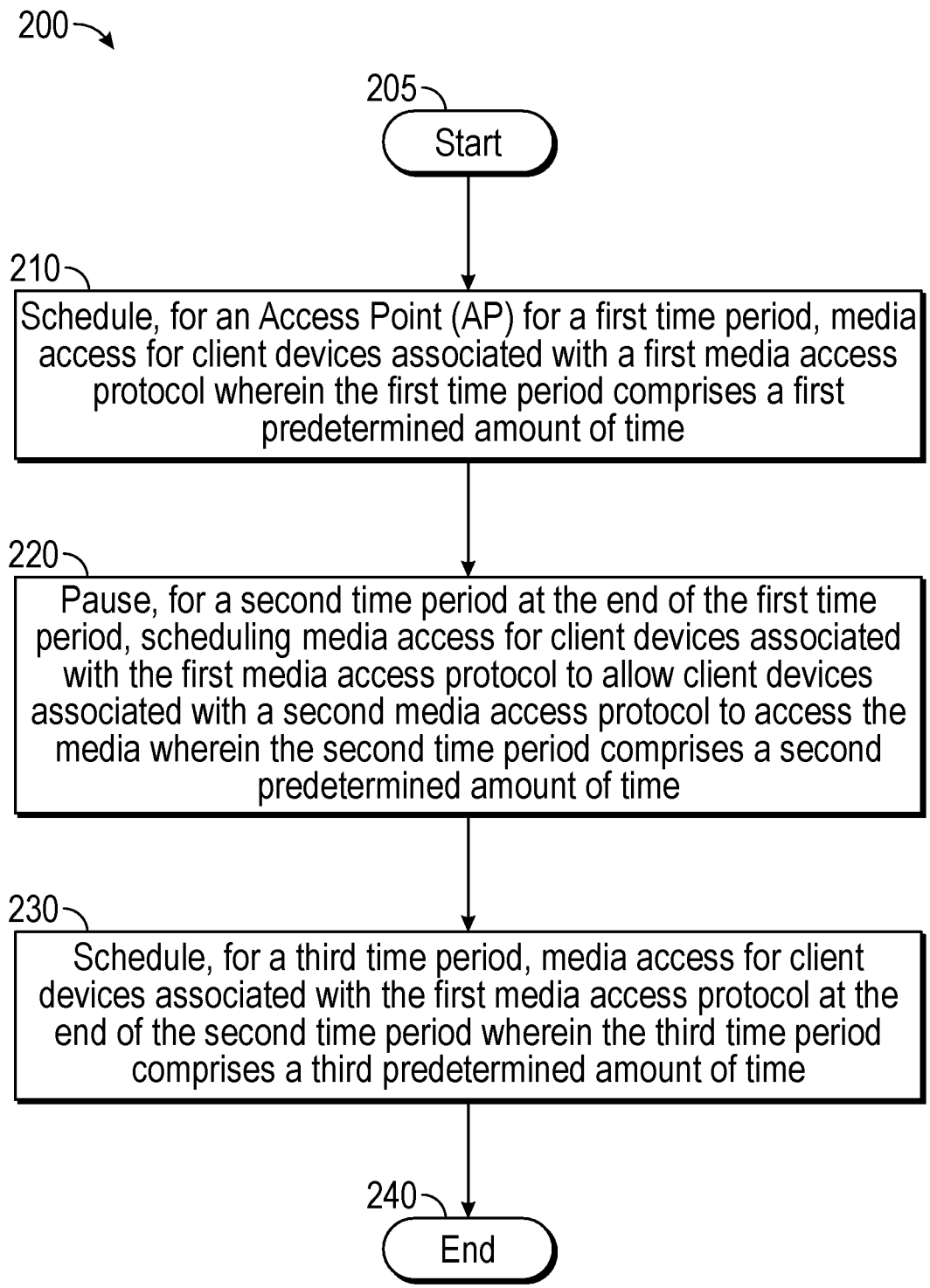
FIG. 2 is a flow chart of a method for providing optimized performance with a first media access protocol and a second media access protocol.

FIG. 2 is a flow chart setting forth the general stages involved in a method 200 consistent with embodiments of the disclosure for providing optimized performance with a first media access protocol (e.g., a non-contention-based protocol such as OFDMA) and a second media access protocol (e.g., a contention-based protocol such as CSMA/CA). Method 200 may be implemented using a computing device 500 as described in more detail below with respect to FIG. 5. For example, computing device 500 may implement or be disposed within AP 105. Notwithstanding, computing device 500 may be located in a WLAN Controller (WLC) or in the cloud for example. Ways to implement the stages of method 200 will be described in greater detail below.

Figure 3:
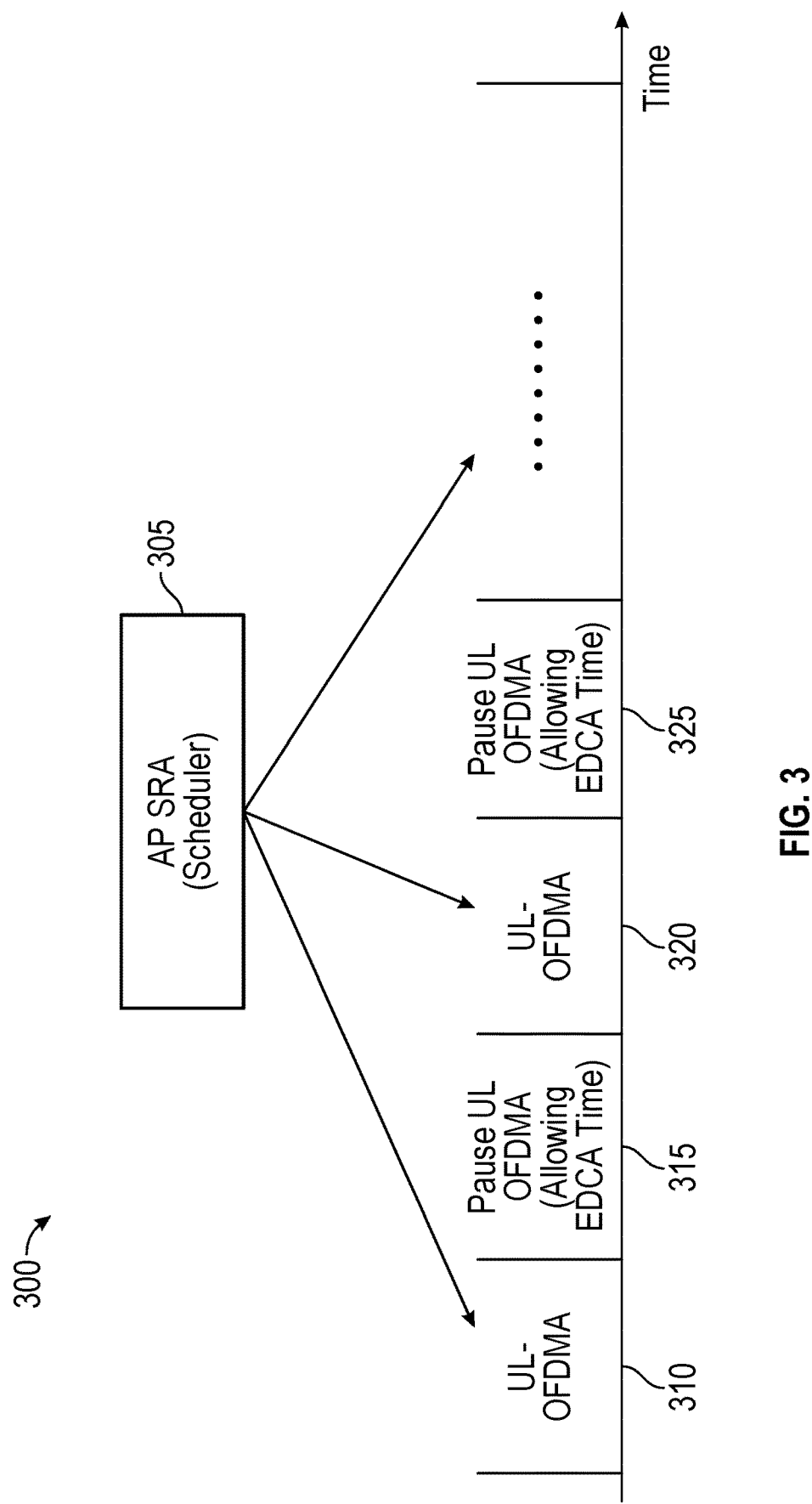
FIG. 3 illustrates an initial state of a schedule.

Method 200 may begin at starting block 205 and proceed to stage 210 where computing device 500 may schedule, for AP 105 for a first time period, media access for client devices associated with the first media access protocol. The first time period may comprise a first predetermined amount of time. For example, FIG. 3 illustrates an initial state of a schedule 300 for AP 105 that may be created by Scheduling and Resource Allocation (SRA) process 305 associated with AP 105. As shown in schedule 300 of FIG. 3, a first time period 310 may be scheduled for media access to AP 105 for client devices within plurality of client devices 115 associated with the first media access protocol. These client devices, for example, may be compatible with 802.11ax and may use the UL-OFDMA process for media access to AP 105. During first time period 310, client devices within plurality of client devices 115 associated with the first media access protocol may be scheduled for and may receive media access through AP 105.

From stage 210, where computing device 500 schedules, for AP 105 for the first time period, media access for client devices associated with the first media access protocol, method 200 may advance to stage 220 where computing device 500 may pause, for a second time period at the end of the first time period, scheduling media access for client devices associated with the first media access protocol to allow client devices associated with the second media access protocol to access the media. The second time period may comprise a second predetermined amount of time. For example, as shown in schedule 300 of FIG. 3, a second time period 315 may be scheduled for media access to AP 105 for client devices within plurality of client devices 115 associated with the second media access protocol. These client devices, for example, may be legacy client devices and may be compatible with 802.11ac and may use the second media access protocol that may be a contention-based access process (e.g., CSMA/CA) for media access to AP 105. Consistent with embodiments of the disclosure, computing device 500 may pause, for second time period 315 at the end of first time period 310, scheduling media access for the client devices associated with the first media access protocol to allow client devices associated with the second media access protocol media access to AP 105 by their contention-based access process.

Once computing device 500 pauses, for the second time period at the end of the first time period, scheduling media access for client devices associated with the first media access protocol to allow client devices associated with the second media access protocol to access the media in stage 220, method 200 may continue to stage 230 where computing device 500 may schedule, for a third time period, media access for client devices associated with the first media access protocol at the end of the second time period. The third time period may comprise a third predetermined amount of time. For example, as shown in schedule 300 of FIG. 3, a third time period 320 may be scheduled for media access to AP 105 for client devices within plurality of client devices 115 associated with the first media access protocol. These client devices, for example, may be compatible with 802.11ax and may use the UL-OFDMA process for media access to AP 105. In other words, after AP 105 pauses the UL-OFDMA process during second time period 315, AP 105 may once again schedule media access for client devices associated with the first media access protocol similar to the process of stage 210. Then AP 105, at the end of third time period 320, may repeated the pausing process of stage 220 for a fourth time period 325 shown in FIG. 3. This process may continue to be repeated. Consistent with embodiments of the disclosure, the first predetermined amount of time, the second predetermined amount of time, and the third predetermined amount of time may be equal. In other embodiments, the first predetermined amount of time and the third predetermined amount of time may be equal and less than the second predetermined amount of time, or the first predetermined amount of time and the third predetermined amount of time may be equal and greater than the second predetermined amount of time.

Accordingly, embodiments of the disclosure may optimize the performance of mixed 802.11ax and 802.11ac WLANs where two different media access processes may be used, for example, one being contention-based (e.g., CSMA/CA) for legacy client devices and the other using UL-OFDMA for 802.11ax. Consistent with embodiments of the disclosure, performance of mixed WLANs may be improved by providing a scheduling process that may pause the UL-OFDMA process to create opportunity windows (i.e., contention opportunities) during the pause for legacy (e.g., 802.11ac) client devices for media access without having to compete unfairly with the 802.11ax UL-OFDMA process.

In an initial state, AP 105 may not know the traffic needs of either the 802.11ax compatible client devices or the 802.11ac compatible legacy client devices. Considering this, SRA process 305 may apportion a relative amount of contention opportunity to the 802.11ac legacy client devices, allowing them media access uninterrupted. For example, if 50% of plurality of client devices 115 are 802.11ac, then SRA process 305 may schedule pausing the UL-OFDMA process 50% of the time, allowing the 802.11ac legacy client devices media access through the legacy contention process. Accordingly, embodiments of the disclosure may create contention opportunities for the legacy 802.11ac clients to provide, for example, a media fairness process to both client device types (e.g., 802.11ac legacy client devices and 802.11ax client devices). Schedule 300 of FIG. 3 may illustrate the above described initial state where both 802.11ac legacy client devices and 802.11ax client devices may be scheduled to have equal media access time to AP 105.

After the initial state as illustrated by schedule 300 of FIG. 3, SRA process 305 may attempt to optimize the overall schedule for AP 105. This may be done by creating a unified 802.11ac contention opportunity plus 802.11ax UL-OFDMA scheduling opportunity that may be reflective of the make-up of the WLAN shown in FIG. 1. Embodiments of the disclosure may optimize throughput by increasing or decreasing the contention opportunity (i.e., the pause in the UL-OFDMA scheduler), allowing legacy contention-based client devices (e.g., 802.11ac client devices) enough media access while at the same time not starving either the 802.11ax client devices or 802.11ac client devices.

Metrics may be used to determine: i) an increase or decrease in the contention opportunity time; or ii) an increase or decrease in the UL-OFDMA scheduling time. These metrics may comprise, but are not limited to: i) the overall throughput of the WiFi channel used for media access measured at AP 105; ii) the average throughput of client devices that use a non-contention-based protocol such as OFDMA (e.g., 802.11ax client devices) as a percentage of the total throughput at AP 105; iii) the average throughput of legacy client devices that use a contention-based protocol such as CSMA/CA (e.g., 802.11ac client devices) as a percentage of the total throughput at AP 105; iv) the retry rate observed on AP 105 to gauge the level of contention of legacy client devices (e.g., 802.11ac client devices); and v) the amount of multicast traffic on legacy client devices (e.g., 802.11ac client devices). By measuring these metrics, SRA process 305 may create an active (e.g., real-time) schedule to service, for example, 802.11ax client devices, while providing an appropriate contention opportunity for legacy 802.11ac client devices.

For example, during periods of high 802.11ac activity or density in micro cell 110, the retry rate may be high and the throughput of the legacy 802.11ac client devices may be suboptimal. As a result, SRA process 305 may schedule a longer contention opportunity for the legacy 802.11ac client devices and apportion less time for 802.11ax client devices that use UL-OFDMA. The result may be a decrease in retries and an increase in legacy 802.11ac client devices performance, while the performance of 802.11ax client devices that use UL-OFDMA may (or may not be) impacted. As this happens, the metrics described above may be continually measured and re-evaluated, in order to optimize the overall throughput while still ensuring both the 802.11ac client devices and 802.11ax client devices may be serviced. If either the 802.11ac or 802.11ax throughput decreases beyond a certain threshold, the schedule may be revised by adjusting the contention opportunity (i.e., pause time) window.

Furthermore, SRA process 305 may analyze UL traffic at AP 105 to identify 802.11ac client devices with rhythmic patterns and adjust the contention window (i.e., pause time) accordingly. In order to provide further resource optimization, SRA process 305 may leverage Target Wake Time (TWT) to schedule UL transmissions on client devices that follow periodic traffic patterns.

While an objective of SRA process 305 may be to provide better medium access to legacy client devices, if the majority of traffic towards legacy 802.11ac client devices may be multicast, 802.11v Directed Multicast Service (DMS) may be used to synchronize multicast transmissions on such client devices and therefore align their DL as well as UL transmissions. Such schemes may enable efficient resource utilization within the contention window (i.e., pause time).

Figure 4:
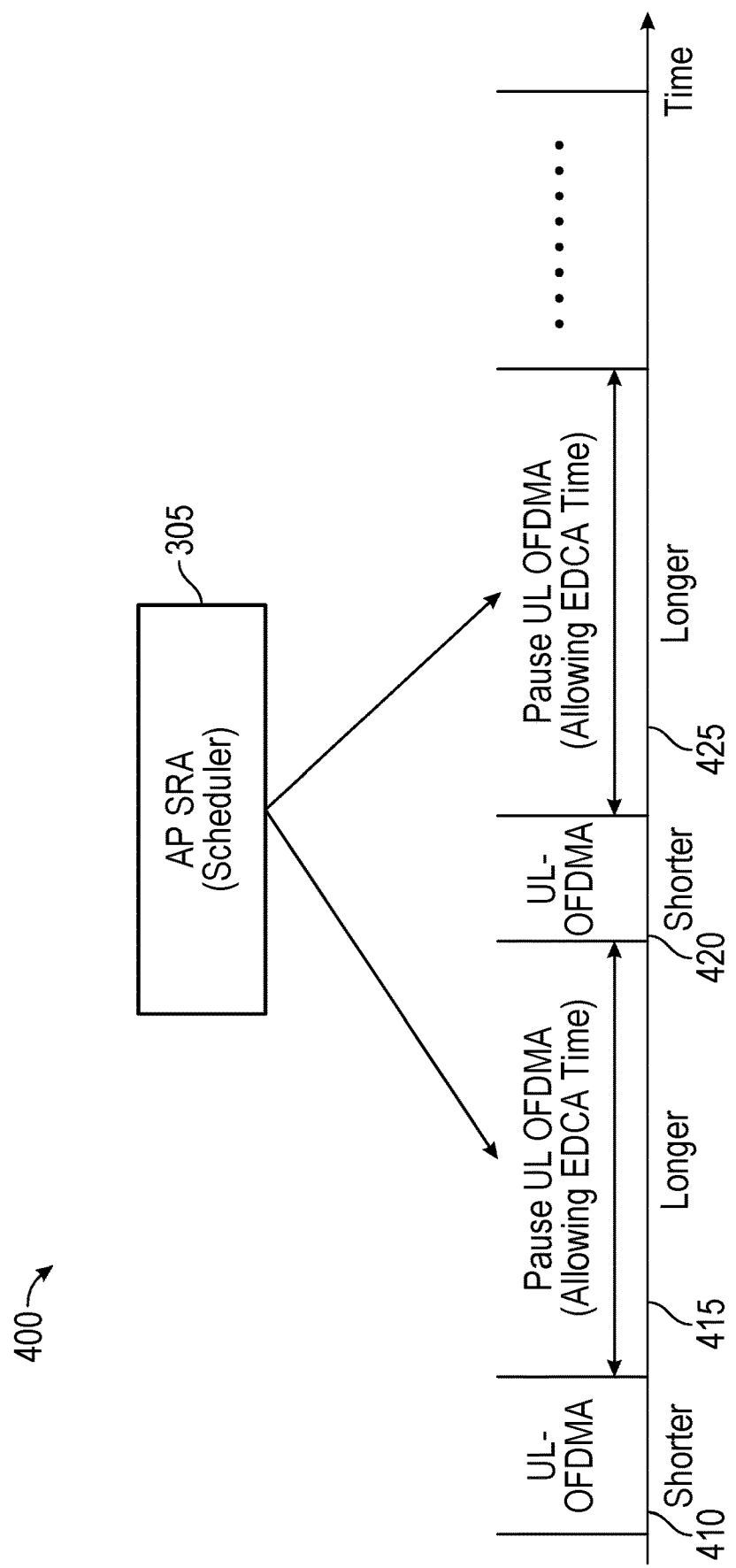
FIG. 4 illustrates a schedule in response to resource optimization.

Thus, in real-time as illustrated in FIG. 4, SRA process 305 may continually adapt a schedule 400 by increasing or decreasing the UL-OFDMA and contention opportunity timing windows to allow greater or less opportunity for legacy client devices to medium access. For example, as compared to schedule 300 of FIG. 3, with the performance of legacy 802.11ac client devices degrading (e.g., an increase in retries by 802.11ac legacy client devices), embodiments of the disclosure may provide shorter UL-OFDMA time periods 410 and 420, and may lengthen pause time periods 415 and 425. SRA process 305 may continually monitor the aforementioned metrics to optimize throughput of AP 105 and minimize retries (while not allowing starvation of either the 802.11ax client devices or 802.11ac client).

Accordingly, embodiments of the disclosure may detect the density of legacy 802.11ac client device activity verses 802.11ax client device activity. This may involve providing balanced UL-OFDMA scheduling for the 802.11ax client devices and allowing the legacy client devices (e.g., 802.11ac client devices) media access. Consequently, SRA process 305 may provide a fairness process based on UL-OFDMA scheduling. After computing device 500 schedules, for the third time period, media access for client devices associated with the first media access protocol at the end of the second time period in stage 230, method 200 may proceed to stage 240 where method 200 may then end at stage 240.

Figure 5:
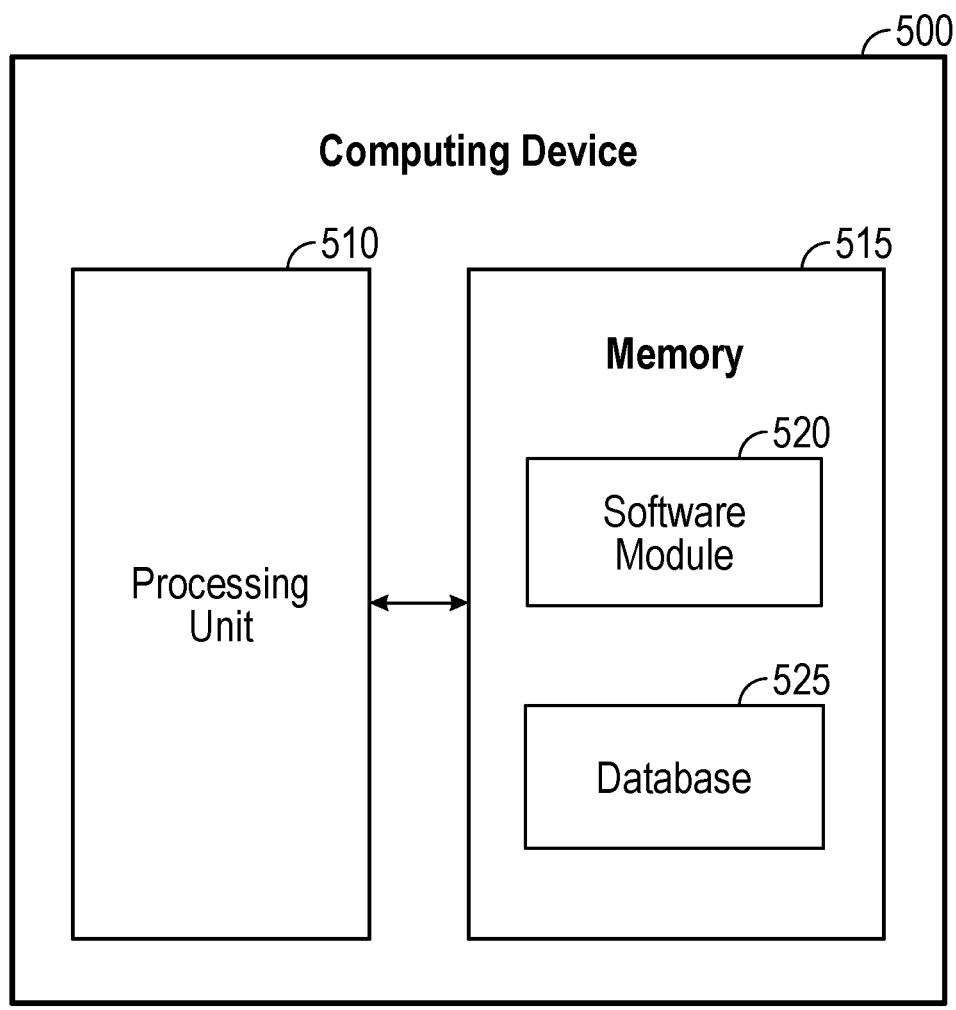
FIG. 5 is a block diagram of a computing device.

FIG. 5 shows computing device 500. As shown in FIG. 5, computing device 500 may include a processing unit 510 and a memory unit 515. Memory unit 515 may include a software module 520 and a database 525. While executing on processing unit 510, software module 520 may perform, for example, processes for providing optimized performance with the first media access protocol and the second media access protocol as described above with respect to FIG. 2. Computing device 500, for example, may provide an operating environment for AP 105, first client device 120, second client device 125, third client device 130, fourth client device 135, or fifth client device 140. AP 105, first client device 120, second client device 125, third client device 130, fourth client device 135, and fifth client device 140 may operate in other environments and are not limited to computing device 500.

Computing device 500 may be implemented using a Wireless Fidelity (Wi-Fi) access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 500 may comprise any computer operating environment, such as hand-held devices, multiprocessor systems, microprocessor-based or programmable sender electronic devices, minicomputers, mainframe computers, and the like. Computing device 500 may also be practiced in distributed computing environments where tasks are performed by remote processing devices. The aforementioned systems and devices are examples and computing device 500 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the elements illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 500 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   scheduling, for an Access Point (AP) for a first time period, media access for client devices associated with a first media access protocol wherein the first time period comprises a first predetermined amount of time;
   pausing, for a second time period at the end of the first time period, scheduling media access for client devices associated with the first media access protocol to allow client devices associated with a second media access protocol to access the media wherein the second time period comprises a second predetermined amount of time;
   scheduling, for a third time period, media access for client devices associated with the first media access protocol at the end of the second time period wherein the third time period comprises a third predetermined amount of time; and
   receiving at least one metric comprising an average throughput of client devices associated with the first media access protocol as a percentage of a total throughput of a WiFi channel measured at the AP.

2. The method of claim 1, wherein the first predetermined amount of time, the second predetermined amount of time, and the third predetermined amount of time are equal.

3. The method of claim 1, wherein the first predetermined amount of time and the third predetermined amount of time are equal and less than the second predetermined amount of time.

4. The method of claim 1, wherein the first predetermined amount of time and the third predetermined amount of time are equal and greater than the second predetermined amount of time.

5. The method of claim 1, wherein the first media access protocol comprises a non-contention-based protocol.

6. The method of claim 5, wherein the first media access protocol comprises Orthogonal Frequency-Division Multiple Access (OFDMA).

7. The method of claim 1, wherein the second media access protocol comprises a contention-based protocol.

8. The method of claim 7, wherein the second media access protocol comprises Carrier-Sense Multiple Access With Collision Avoidance (CSMA/CA).

9. The method of claim 1, further comprising determining, based on the received at least one metric, a value for the first predetermined amount of time.

10. The method of claim 1, further comprising determining, based on the received at least one metric, a value for the second predetermined amount of time.

11. A system comprising:
    a memory storage; and
    a processing unit coupled to the memory storage, wherein the processing unit is operative to:
       receive at least one metric associated with an Access Point (AP) wherein the at least one metric comprises an average throughput of client devices associated with a second media access protocol as a percentage of a total throughput of a WiFi channel measured at the AP;
       determine, based on the received at least one metric, a value for a first predetermined amount of time;
       determine, based on the received at least one metric, a value for a second predetermined amount of time;
       schedule, for the AP for a first time period, media access for client devices associated with a first media access protocol wherein the first time period comprises the first predetermined amount of time;
       pause, for a second time period at the end of the first time period, scheduling media access for client devices associated with the first media access protocol to allow the client devices associated with the second media access protocol to access the media wherein the second time period comprises the second predetermined amount of time; and
       schedule, for a third time period, media access for client devices associated with the first media access protocol at the end of the second time period wherein the third time period comprises the first predetermined amount of time.

12. A non-transitory computer-readable medium that stores a set of instructions which when executed performs a method comprising:
    scheduling, for an Access Point (AP) for a first time period, media access for client devices associated with a first media access protocol wherein the first time period comprises a first predetermined amount of time;
    pausing, for a second time period at the end of the first time period, scheduling media access for client devices associated with the first media access protocol to allow client devices associated with a second media access protocol to access the media wherein the second time period comprises a second predetermined amount of time; and
    scheduling, for a third time period, media access for client devices associated with the first media access protocol at the end of the second time period wherein the third time period comprises a third predetermined amount of time; and
    receiving at least one metric comprising an average throughput of client devices associated with the first media access protocol as a percentage of a total throughput of a WiFi channel measured at the AP.

13. The non-transitory computer-readable medium of claim 12, wherein the first media access protocol comprises Orthogonal Frequency-Division Multiple Access (OFDMA)

and the second media access protocol comprises Carrier-Sense Multiple Access With Collision Avoidance (CSMA/CA).

14. The system of claim 11, wherein the first predetermined amount of time, the second predetermined amount of time, and the third predetermined amount of time are equal.

15. The system of claim 11, wherein the first predetermined amount of time and the third predetermined amount of time are equal and less than the second predetermined amount of time.

16. The system of claim 11, wherein the first predetermined amount of time and the third predetermined amount of time are equal and greater than the second predetermined amount of time.

17. The non-transitory computer-readable medium of claim 12, wherein the first predetermined amount of time, the second predetermined amount of time, and the third predetermined amount of time are equal.

18. The non-transitory computer-readable medium of claim 12, wherein the first predetermined amount of time and the third predetermined amount of time are equal and less than the second predetermined amount of time.

19. The non-transitory computer-readable medium of claim 12, wherein the first predetermined amount of time and the third predetermined amount of time are equal and greater than the second predetermined amount of time.

20. The non-transitory computer-readable medium of claim 12, wherein the first media access protocol comprises a non-contention-based protocol and the second media access protocol comprises a contention-based protocol.

* * * * *